A. B. LOW.
PORTABLE VULCANIZING PACKAGE.
APPLICATION FILED AUG. 16, 1915.
1,163,629. Patented Dec. 7, 1915.
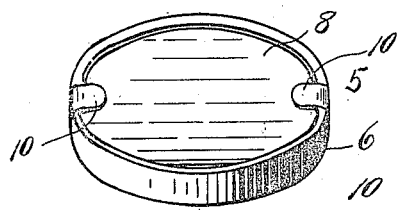
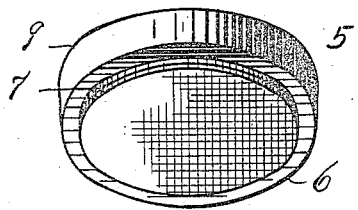
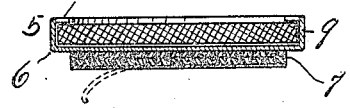
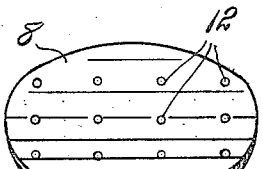
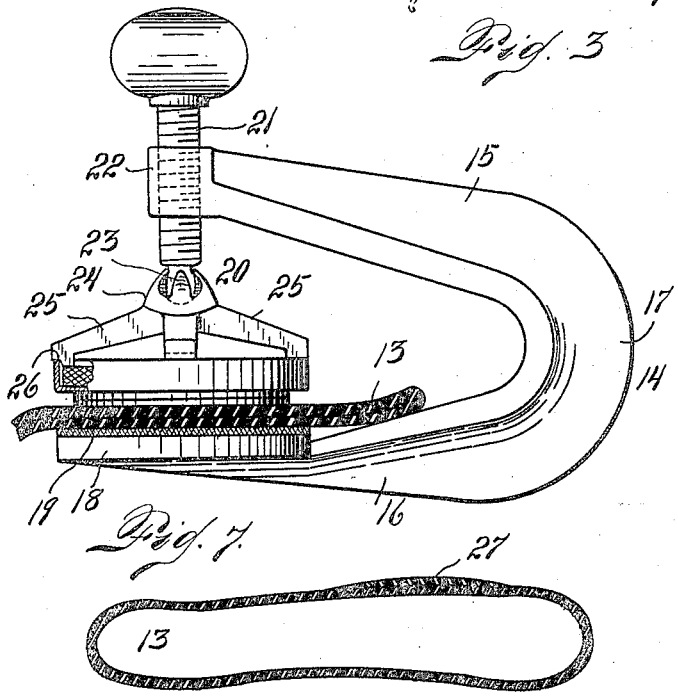
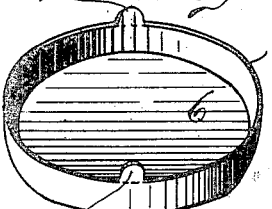
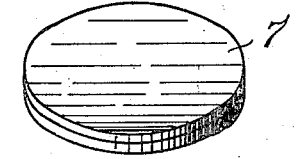
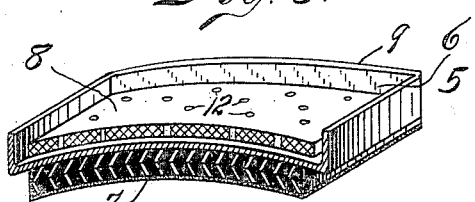
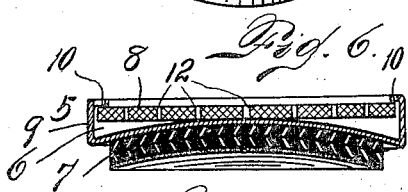
Witness
Otto E. Hoddick.
F. A. Van Rossem.
Inventor
Arthur B. Low.
By A. J. Cook
Attorney

UNITED STATES PATENT OFFICE.

ARTHUR B. LOW, OF DENVER, COLORADO.

PORTABLE VULCANIZING-PACKAGE.

1,163,629. Specification of Letters Patent. Patented Dec. 7, 1915.

Application filed August 16, 1915. Serial No. 45,656.

*To all whom it may concern:*

Be it known that I, ARTHUR B. LOW, a citizen of the United States, residing in the city and county of Denver and State of Colorado, have invented certain new and useful Improvements in Portable Vulcanizing-Packages; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a portable package adapted to be used for applying patches to the inner tubes of pneumatic tires or to other or similar articles which may be repaired by vulcanizing a patch thereon.

The invention is specially adapted for use in repairing the inner tubes of bicycle tires, motorcycle tires and automobile tires. Each package which may be of any suitable size, depending upon the use to which it is to be put, is adapted for use in applying a single patch.

The device consists of a pan composed of some suitable material, to one side of which is applied a piece of gum or other suitable vulcanizable material, while to the other side is applied a combustible substance, of such heating capacity, as to furnish the necessary heat for vulcanizing purposes. It is evident that the vulcanizable material may vary so far as its composition is concerned; that the pan may vary in shape, size, and in the material of which it is composed; and also that the combustible material may be of any suitable character.

It is preferred that the pan employed shall be composed of tin or other suitable cheap sheet metal and that the same shall be circular or disk shape and have a shallow rim projecting upwardly, of such depth as to retain the combustible material in position. This combustible material is preferably of such shape as to fit closely and tightly within the pan so that if desired it may be retained therein without any special construction so far as the pan is concerned. The rim of the latter may however be provided with one or more lips which may be bent down to retain the combustible material in place. This combustible feature may be composed of any suitable absorbent material which may be dipped in some liquid or some liquid substance which will increase its heating capacity. I have found pasteboard saturated with a solution of saltpeter and sugar, entirely satisfactory for this purpose. The vulcanizable part of this package may be composed either of a single substance or a plurality of substances and may consist of one or more layers. In any event the vulcanizable member will be attached to the bottom of the pan in such a manner that it will retain its position thereon and so that the pan may be readily removed after the vulcanizing operation has been accomplished.

Having briefly outlined the invention I will proceed to describe the same in detail, reference being made to the accompanying drawing in which is illustrated an embodiment thereof.

In this drawing,—Figure 1 is a perspective view of my vulcanizing package tilted to show the upper surface thereof. Fig. 2 is a similar view tilted to show the lower surface. Fig. 3 is a central vertical section taken through the package. Fig. 4 is a perspective view of the combustible feature or member of the package, shown in detail. Fig. 5 is a perspective view in detail illustrating the pan or metal member of the package. Fig. 6 is a similar view of the vulcanizable feature. Fig. 7 is a view of my improved package showing the same in connection with a clamp for holding the package in coöperative relation with a tube during the mending operation. Fig. 8 is a section taken through a tube after the same has been repaired and cutting the patch, which has been vulcanized thereon. Fig. 9 is a sectional view in perspective of a package whose general contour is rectangular, its lower surface being cylindrically concave. Fig. 10 is a sectional elevation of another form of package. In this case the lower surface is spherically concave.

The same reference characters indicate the same parts in all the views.

Let the numeral 5 designate my improved package considered in its entirety and consisting of a pan 6, a vulcanizable member 7 applied to the lower surface thereof; and a combustible member 8 which is located within the pan and engaging the bottom on the upper surface thereof; this combustible member being arranged in opposing relation to the vulcanizable feature 7. The member 7 is attached to the lower surface of the bottom of the pan in any suitable manner, the only requirement being that it shall retain itself in place thereon until the package is used. It may be secured in any suitable manner. The combustible member 8 is fitted into the pan which is preferably circular in shape and provided with an upwardly projecting flange 9 for retaining the material 8 in place. This flange may be equipped with one or more lips 10 which when the pan is originally made, extend upwardly as shown in Fig. 5. As soon however as the combustible element 8 is put in place within the pan, these lips may be turned down for retaining purposes. (See Fig. 1.) As shown in the drawing the vulcanizable feature 7 is composed of two layers of gum or other suitable vulcanizable material.

The combustible feature may consist of any suitable absorbent material dipped in a liquid or semi-liquid substance which will give to the said material the necessary heating capacity for the purpose. It will be understood that the small disk of cardboard or other suitable absorbent material, having the area of an ordinary patch preferably somewhat less than two inches in diameter and comparatively thin, would not in the absence of some additional material, produce the necessary heat for vulcanizing purposes. I have found however that when this cardboard disk is saturated with saltpeter, that it will answer every requirement.

As illustrated in Fig. 4 of the drawing, the combustible element 8 is provided with a series of perforations 12 which may be employed for the purpose of facilitating the burning of this feature of the device.

In the form of construction shown in Fig. 9, the pan 5 is rectangular in outline the under surface of its bottom being cylindrically concave while its upper surface is correspondingly convex. The combustible element 8 as well as the vulcanizable feature 9 is made of corresponding shape. This may be desirable for use in vulcanizing a patch upon a convex surface.

In the form of construction shown in Fig. 10, the lower surface of the pan is spherically concave and the vulcanizable feature 9 of corresponding shape. This may be desirable in applying a patch to a spherical surface. In this form of construction the combustible element 8 is flat on both sides.

I have thus illustrated a few of the forms in which my improved package may be made, and it is evident that the invention is not limited to any particular shape and that the specific form may be varied as circumstances may require or dictate.

Assuming that the package is completed and of the form illustrated in the drawing, it may be applied to the tube 13 by means of a suitable clamp 14. As shown in the drawing this clamp is composed of upper and lower arms 15 and 16 connected by a bend 17. The arm 16 terminates in a disk 18 which forms a supporting base for the tire 13 and is provided on its upper surface with a layer of asbestos, felt or other suitable material 19 constituting a heat insulator. The portion of the tube to be vulcanized, is placed upon this base of the clamp, while the vulcanizing package with the element 7 lowermost is applied thereto, the element 7 being placed to directly cover the part to be repaired. A movable clamping member 20, is then applied to the package from above. As shown in the drawing this feature 20 consists of a screw 21 passing through a threaded opening formed in the extremity 22 of the upper arm 15. The lower end of this screw terminates in a ball 23 which engages a socket 24 from which three arms 25 extend downwardly and outwardly, their extremities having shoulders 26 which rest upon the upper edge of the flange 9 of the pan, the inner portions of these arms resting upon the combustible element 8. As the screw 21 is turned in the proper direction, the package is tightly clamped upon the portion of the tire or tube 13 to be repaired. The combustible element 8 is then ignited and the heat generated thereby, is of sufficient intensity and lasts during the time necessary for perfectly performing the vulcanizing function. The time required is from five to seven minutes. The clamp is then loosened and removed from the pan, after which the latter may be readily detached from the patch which is retained in place upon the tube or tire as shown at 27. (See Fig. 8.)

From the foregoing description it will be understood that my improved package is adapted for use for a single vulcanizing operation only, the vulcanizable material being retained by the tube or tire, the combustible material being consumed, leaving the pan only intact. This pan, of course, is discarded as it has no particular value.

My improved package has the advantage of being exceedingly cheap, efficient, and capable of use without danger, since the combustible element of the package, burns without flame or sparks, which might be liable to ignite any combustible material as gasolene, a considerable quantity of which is usually carried by every automobile.

While it is preferred that the pan, the combustible material and the vulcanizable material shall be united to form a package, it is evident that they may be carried separately and assembled at the time they are used. It is therefore evident that the scope of the invention is sufficiently comprehensive to cover the three articles whether originally united to form a single package or whether assembled for the first time when they are used.

Having thus described my invention, what I claim is,—

1. A vulcanizing package comprising a holder carrying a quantity of combustible material on one side and a quantity of vulcanizable material on the opposite side.

2. A package of the class described comprising a holder including a metal plate having a combustible element and a vulcanizable element respectively applied to its opposite sides.

3. A package of the class described comprising a pan carrying a quantity of non-liquid combustible material, the lower surface of its bottom being equipped with a quantity of vulcanizable material.

4. A portable vulcanizing package comprising a metal pan carrying a quantity of non-liquid combustible material and having a quantity of vulcanizable material applied to the lower surface of its bottom.

5. A portable vulcanizing package comprising a pan having a shallow wall inclosing a quantity of non-liquid combustible material, the lower surface of the bottom of the pan being equipped with a quantity of vulcanizable material.

6. A package of the class described comprising a pan having a shallow upwardly projecting flange or wall inclosing a quantity of non-liquid combustible material, the pan having lips for retaining said material in place, the lower surface of the bottom of the pan being equipped with a quantity of vulcanizable material.

7. A package of the class described comprising a pan having a shallow wall inclosing a quantity of non-liquid combustible material, the lower surface of its bottom being concavely curved and carrying a layer of vulcanizable material of substantially uniform thickness.

8. A vulcanizing package comprising a pan carrying a quantity of absorbent material saturated with a substance to facilitate combustion and enhance its heat generating capactiy, the lower surface of the bottom of the pan having secured thereto a quantity of vulcanizable material.

9. A package of the class described comprising a pan carrying a quantity of non-flaming combustible material; the lower surface of the bottom of the pan having a quantity of vulcanizable material removably applied thereto.

10. A package of the class described comprising a pan carrying a quantity of non-flaming, non-liquid combustible material, the lower surface of the bottom of the pan being provided with a quantity of vulcanizable material readily removable therefrom after the vulcanizing process has been completed.

11. A package of the class described comprising a pan carrying a quantity of absorbent material saturated with a non-flaming combustible substance, the said pan having a quantity of vulcanizable material removably applied to the lower surface of its bottom.

12. A package of the class described comprising a pan carrying a quantity of absorbent material saturated with a non-flaming combustible substance of such character as to facilitate combustion and enhance the heat generating capacity of the material, the said pan having a quantity of vulcanizable material applied to the lower surface of its bottom in such a manner as to be readily removable after the vulcanizing process is completed.

13. A package of the class described comprising a pan carrying a quantity of absorbent material saturated with a non-flaming combustible substance, the said pan having a quantity of vulcanizable material removably applied to the lower surface of its bottom, the lower surface of the vulcanizable material having a removable protecting covering.

14. The vulcanizing means herein described comprising a pan, a layer of combustible material and a layer of vulcanizable material, the two layers being arranged on opposite sides of the pan.

15. The combination of vulcanizing means composed of a non-liquid combustible substance, a vulcanizable substance and a pan, the two substances being arranged on opposite sides of the pan, and means for holding the said articles in place during the vulcanizing operation.

16. The combination of vulcanizing means composed of a non-liquid combustible substance, a vulcanizable substance and a pan, the two substances being arranged on opposite sides of the pan, and means for holding the said articles in place during the vulcanizing operation, said last named means comprising a clamping device.

In testimony whereof I affix my signature in presence of two witnesses.

ARTHUR B. LOW.

Witnesses:
 GRACE HUSTON,
 A. J. O'BRIEN.